United States Patent [19]
Ranasinghe et al.

[11] Patent Number: 6,058,695
[45] Date of Patent: May 9, 2000

[54] GAS TURBINE INLET AIR COOLING METHOD FOR COMBINED CYCLE POWER PLANTS

[75] Inventors: Jatila Ranasinghe, Niskayuna; Raub Warfield Smith, Ballston Lake, both of N.Y.

[73] Assignee: General Electric Co., Schenectady, NY

[21] Appl. No.: 09/063,192

[22] Filed: Apr. 20, 1998

[51] Int. Cl.$^7$ .................................................. F02C 6/00
[52] U.S. Cl. ........................ 60/39.182; 60/649; 60/673; 60/728
[58] Field of Search ................ 60/39.182, 728, 60/649, 673; 62/238.3, 476

[56] References Cited

U.S. PATENT DOCUMENTS 5,095,708   3/1992   Kalina .
5,555,738   9/1996   DeVault ................... 62/238.3

FOREIGN PATENT DOCUMENTS 63-215841   9/1988   Japan ........................ 60/728

*Primary Examiner*—Noah P. Kamen
*Attorney, Agent, or Firm*—Nixon & Vanderhye

[57] ABSTRACT

In a combined cycle power system having a gas turbine and one or more bottoming cycle expansion turbines for driving one or more generators, compressor inlet air to the gas turbine is cooled. An extraction is taken from the distillation condensation sub-system of the Kalina cycle and throttled to a lower pressure, with a corresponding temperature drop for supply to a low pressure evaporator in heat exchange relation with ambient air flowing to the compressor inlet to cool the ambient air. The partially evaporated multi-component mixture exiting the low pressure evaporator is returned to the spent vapor stream from the low pressure expansion turbine for combination therewith and condensation. Consequently, compressor inlet air inlet to the gas turbine is cooled, thereby increasing mass flow and turbine output.

16 Claims, 5 Drawing Sheets

GAS TURBINE INLET AIR COOLING METHOD FOR COMBINED CYCLE POWER PLANTS

TECHNICAL FIELD

The present invention relates to a method of cooling compressor inlet air for the gas turbine of a combined cycle power plant and particularly relates to a method employing a stream of dissimilar components in the distillation condensation sub-system of the combined cycle system to absorb heat from gas turbine inlet air, thereby cooling the compressor inlet air and returning the dissimilar component vapor to the sub-system.

BACKGROUND

Gas turbine output can be readily increased by cooling ambient air entering the gas turbine compressor. The air density increases with decreasing temperature and results in higher mass flow through the gas turbine. The gas turbine output increases with increased mass air flow, thus providing higher turbine output with inlet air cooling. Gas turbine inlet air cooling has been used to increase power output during peak demand periods in gas turbine combined cycle power plants.

A combined cycle power plant in its simplest form consists of a gas turbine, a steam turbine, a generator and a heat recovery steam generator (HRSG) with the gas turbine and steam turbine coupled to the single generator in tandem on a single shaft. Multi-shaft arrangements having one or more gas turbine generators and a common steam turbine generator have been utilized. The thermal efficiency of combined cycle power plants is determined by the performance of the gas turbine in combination with its heat recovery bottoming cycle. Kalina-type thermodynamic bottoming cycles have been studied for combined cycle application. The Kalina cycle employs a working fluid comprised of a mixture of dissimilar components, e.g., ammonia and water. A distillation condensation sub-system (DCSS) is used to absorb, condense and regenerate the working fluid after exhausting from the low pressure vapor turbine in the Kalina bottoming cycles. The DCSS system allows the working fluid to be condensed at a lower pressure, with available cooling water temperature, compared to direct condensation. The DCSS system is a significant contributor to the superior thermal efficiency of Kalina bottoming cycles compared to conventional Rankine bottoming cycles. Various types of Kalina-type thermodynamic cycles are known, including the cycle disclosed in U.S. Pat. No. 5,095,708, the disclosure of which is incorporated herein by reference.

DISCLOSURE OF THE INVENTION

In accordance with the present invention, there is provided a gas turbine inlet air cooling system which is integrated with a Kalina bottoming cycle including a distillation condensation sub-system (DCSS) for use in a Kalina-type combined cycle power plant. The integrated gas turbine inlet chilling system hereof which uses the DCSS for condensation of the working fluid leaving the gas turbine inlet chiller evaporators, affords a more economical and efficient system than a non-integrated stand-alone cooling system for compressor inlet air. In a particular form of the present invention, there is provided a gas turbine and at least one vapor turbine, and preferably high, intermediate and low pressure turbines, coupled to one or more generators for generating electric power. The Kalina bottoming cycle includes a regenerative boiler and a distillation/condensation sub-system which absorbs, condenses and regenerates the working fluid exhausting from the low pressure vapor turbine. In the present method, the multi-component working fluid is extracted from the high pressure section of the DCSS, preferably a liquid mixture richer in the lower boiling point component, and uses that extraction as the working fluid in the turbine inlet air cooling system. The extracted multi-component stream is throttled to the DCSS LP section pressure to produce a temperature drop, and then is passed through a low pressure evaporator in heat exchange relation with ambient compressor inlet air to cool the air. That is, the heat from the turbine inlet air is absorbed, cooling the air stream and partially evaporating the rich multi-component mixture. The partially evaporated multi-component mixture is then admitted to the DCSS low pressure section where it is combined with the spent stream from the low pressure turbine and fully condensed in the DCSS low pressure condenser. While a single-stage gas turbine inlet air cooling cycle is described, the present invention can be implemented as a multiple-stage system.

In a preferred embodiment according to the present invention, there is provided in a combined cycle power generating system having a plurality of turbines, including a first turbine and a gas turbine having a compressor, the turbines being drivingly coupled to one or more generators for producing electricity, and a distillation/condensation sub-system, a method of cooling ambient air entering the gas turbine, comprising the steps of (a) expanding a working fluid comprised of a mixture of dissimilar components having different boiling points at the same pressure through the first turbine and generating a spent stream of the mixture of dissimilar components, (b) condensing the spent stream in the sub-system, (c) passing inlet air for the compressor of the gas turbine in heat exchange relation with the condensed spent stream in a first heat exchanger to cool the inlet air entering the gas turbine compressor and (d) flowing the cooled inlet air into the compressor of the gas turbine.

In a further preferred embodiment according to the present invention, there is provided in a combined cycle power generating system having a plurality of turbines, including a first turbine and a gas turbine having a compressor, the turbines being drivingly coupled to one or more generators for producing electricity, and a distillation/ condensation sub-system, a method of cooling another fluid distinct from fluids of the distillation/condensation sub-system, comprising the steps of (a) expanding a working fluid comprised of a mixture of dissimilar components having different boiling points at the same pressure through the first turbine and generating a spent stream of the mixture of dissimilar components, (b) condensing the spent stream in the sub-system and (c) passing another fluid in heat exchange relation with the condensed spent stream in a first heat exchanger to cool another fluid.

In a still further preferred embodiment according to the present invention, there is provided in a combined cycle power generating system having a plurality of turbines, including a vapor turbine and a gas turbine having a compressor, the turbines being drivingly coupled to one or more generators for producing electric or mechanical work and a distillation/condensation sub-system, a method of cooling ambient air entering the gas turbine, comprising the steps of (a) expanding a working fluid comprised of a mixture of dissimilar components having different boiling points at the same pressure through the vapor turbine and generating a spent stream of the mixture of dissimilar components, (b) condensing the spent stream in a low pressure section of the distillation/condensation sub-system, (c) passing inlet air for the compressor of the gas turbine in heat exchange relation with a condensed and throttled spent stream from a higher pressure section of the distillation/condensation sub-system in a first heat exchanger to cool the inlet air entering the gas turbine compressor and (d) flowing the cooled inlet air into the compressor of the gas turbine.

Accordingly, it is a primary object of the present invention to provide a novel and improved gas turbine inlet air cooling system integrated with a Kalina bottoming cycle for use in Kalina combined cycle power plants.

BEST MODE FOR CARRYING OUT THE INVENTION

Figure 1:
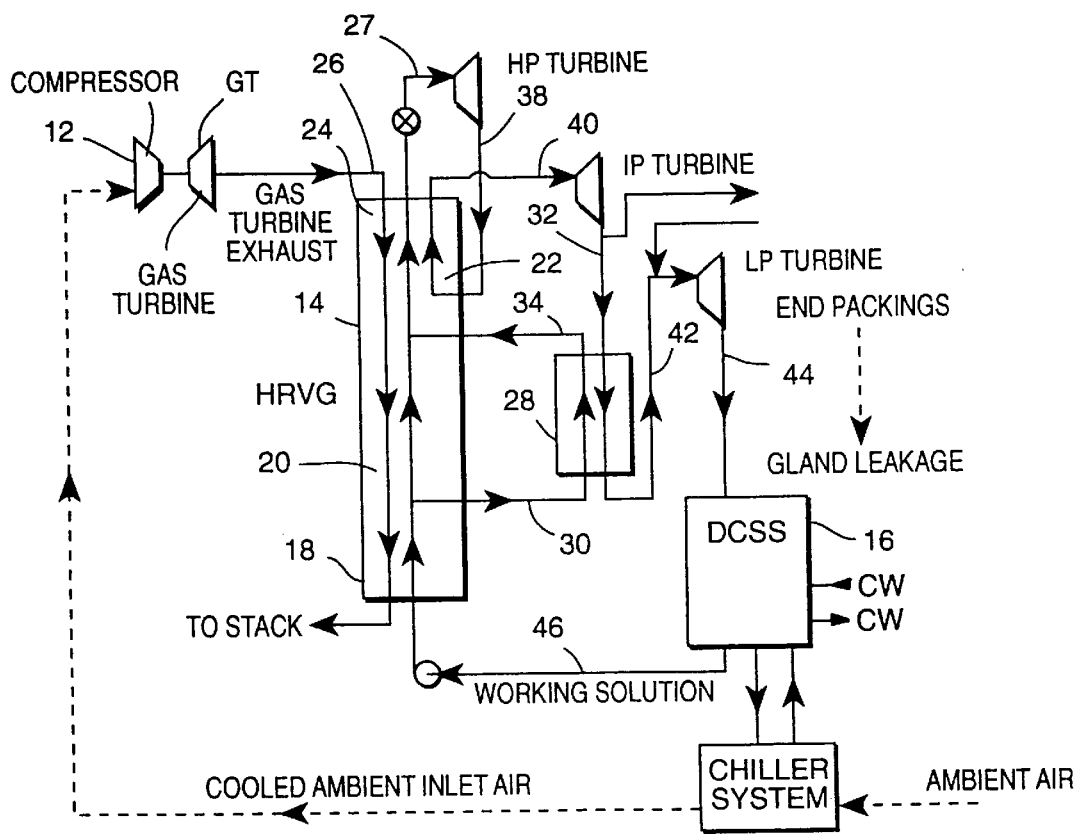
FIG. 1 is a schematic illustration of a combined cycle power plant employing a Kalina-type thermodynamic cycle illustrating a gas turbine inlet air cooling system integrated with the Kalina bottoming cycle according to the present invention.

Referring now to the drawing figures, particularly to FIG. 1, there is illustrated a combined cycle power plant employing a Kalina-type thermodynamic cycle for driving a generator and comprised of a gas turbine GT having a compressor 12 and high, intermediate and low pressure vapor turbines HP, IP and LP, respectively, all coupled to one or more generators for generating electrical power or performing mechanical work. The system includes a Kalina bottoming cycle, i.e., a thermodynamic cycle which includes the HP, IP and LP vapor turbines, a boiler 14 and a distillation/condensation sub-system 16 (DCSS). As appreciated from the foregoing reference to the Kalina cycle, a multi-component working fluid mixture is used that comprises a low boiling point fluid and a relatively higher boiling point fluid. For example, a mixture of ammonia/water may be used, although other mixtures will occur to those skilled in this art.

As illustrated in FIG. 1, a completely condensed working fluid passes through the boiler 14, the boiler including a preheater section 18, an evaporator section 20, a reheater section 22 and a superheater section 24. Heat is supplied to the boiler 14 from the exhaust of the gas turbine GT as indicated by line 26. Preheated working fluid passing through preheater section 18 is divided into a first stream for entering evaporator section 20 and a second stream entering a regenerative boiler 28 via line 30. The first stream in the evaporator section 20 is heated by the countercurrent flow of the exhaust gases from the gas turbine via line 26. The second fluid stream 30 flowing through the regenerative boiler 28 is heated by the exhaust stream from the intermediate pressure turbine IP via line 32 which flows through the regenerative boiler 28 in countercurrent relation to the flow of the second stream 30. The evaporated fluid of the first and second streams is then recombined in the boiler 14, the fluid of the second stream returning from the boiler via line 34. The recombined stream of working fluid passes through the superheater 24 where it is finally superheated by heat exchange with part of the gas turbine exhaust stream 26 for flow via line 27 to the inlet of the high pressure turbine HP, where it is expanded to convert thermal energy into mechanical energy to drive the turbine. The expanded working fluid stream from the high pressure turbine HP returns to boiler 14 via line 38 and is reheated in reheater section 22 lying in heat exchange with the gas turbine exhaust via line 26. The reheated working fluid then flows to the inlet of the intermediate pressure turbine IP via line 40. The working fluid expanded through the intermediate pressure turbine IP passes to the regenerative boiler 28 via line 32 in heat exchange relation with the second working fluid stream supplied boiler 28 via line 30. The working fluid from the IP turbine is thus cooled, providing the heat necessary for the evaporation of the working fluid in line 30. From the regenerative boiler 28, the working fluid passes via line 42 to the inlet of the low pressure turbine LP, where it is expanded to a final fluid pressure level. The expanded fluid from the low pressure turbine LP passes to the distillation/condensation sub-system 16 via line 44, where the fluid stream is condensed, pumped to a higher pressure and sent to the preheater section 18 via line 46 to continue the cycle.

Figure 2:
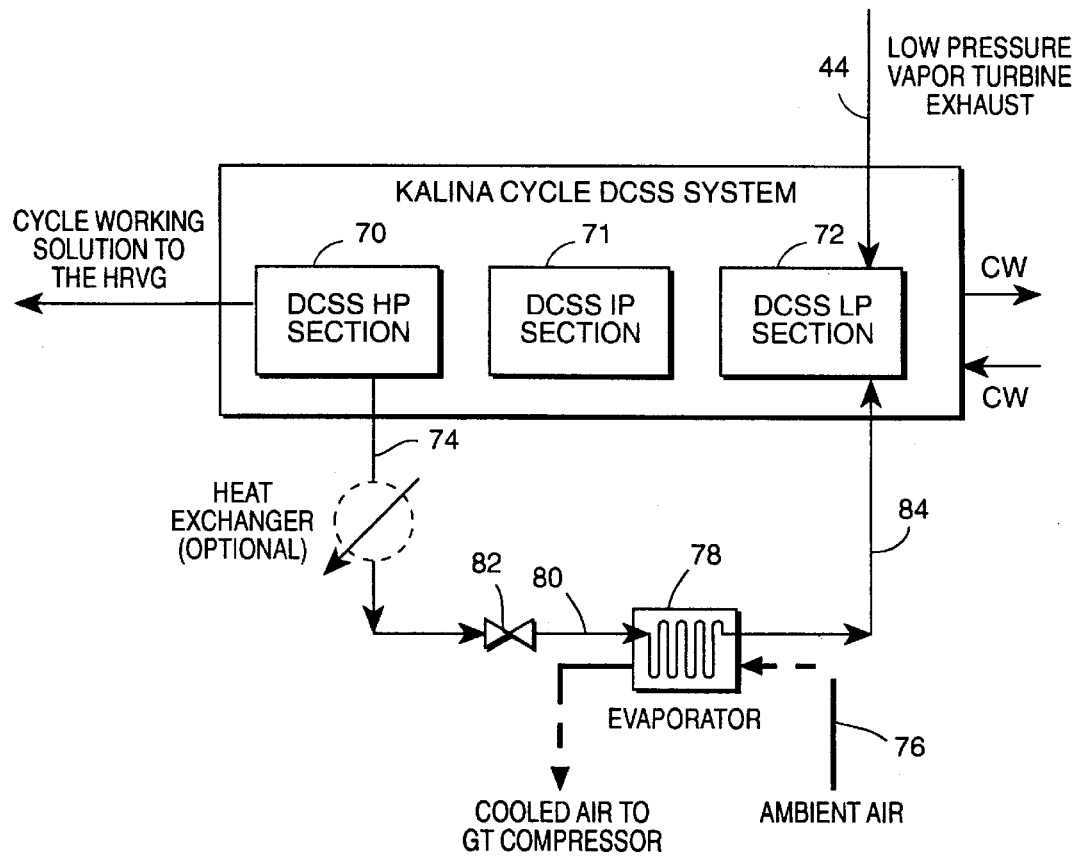
FIG. 2 is schematic illustration of a single-stage chiller system for the compressor inlet air using the Kalina bottoming cycle multi-component stream to absorb heat from the inlet air.

The Kalina cycle gas turbine compressor inlet air chilling apparatus and method, in its most basic form, is illustrated in FIG. 2, using a general DCSS system. The Kalina cycle DCSS system is used to absorb, condense and regenerate the working fluid leaving the LP vapor turbine. A DCSS system has a minimum of two pressure levels at which the working fluid mixture of two different compositions is completely condensed (e.g., the illustrated HP section 70 and LP section 72). The more efficient DCSS systems have three pressure levels and mixture compositions at which complete condensation occurs (e.g., HP section 70, IP section 71 and LP section 72). A DCSS mixture stream is assigned to a particular pressure section by determining the final condenser which sets the pressure of that stream (e.g., the LP condenser 72 sets the pressure of the vapor turbine exhaust line and, hence, the turbine exhaust line is considered to be in the LP section of the DCSS). The present invention can be applied to any DCSS system with two or more pressure level condensers.

A saturated or sub-cooled liquid stream 74 rich in the lower boiling point component (e.g., ammonia-rich) is extracted from the high pressure section 70 of the DCSS system (an extraction from the final HP condenser is preferred). This stream 74 is then throttled to the DCSS LP section pressure, which results in a temperature drop required to absorb heat from the ambient air entering the GT compressor. GT compressor inlet air stream 76 is cooled in heat exchanger, i.e., evaporator 78, in countercurrent or co-current relation to the cold mixture stream 80 from the throttling element 82. The multi-component mixture (two-phase or vapor state) leaving the evaporator 78 via line 84 is sent to the low pressure section 72 of the DCSS, where it combines with the low pressure vapor turbine exhaust of line 44 at an appropriate location in the DCSS LP section 72 for condensation.

This results in the use of the DCSS system for the dual purpose of condensing the vapor turbine exhaust and chilling the compressor air inlet stream, which affords an efficient and economical system design.

An additional optional feature for this basic system is to sub-cool stream 74 with countercurrent heat exchange with a split stream from lines 80 or 84. This feature increases the cooling capacity of the system.

Figure 3A:
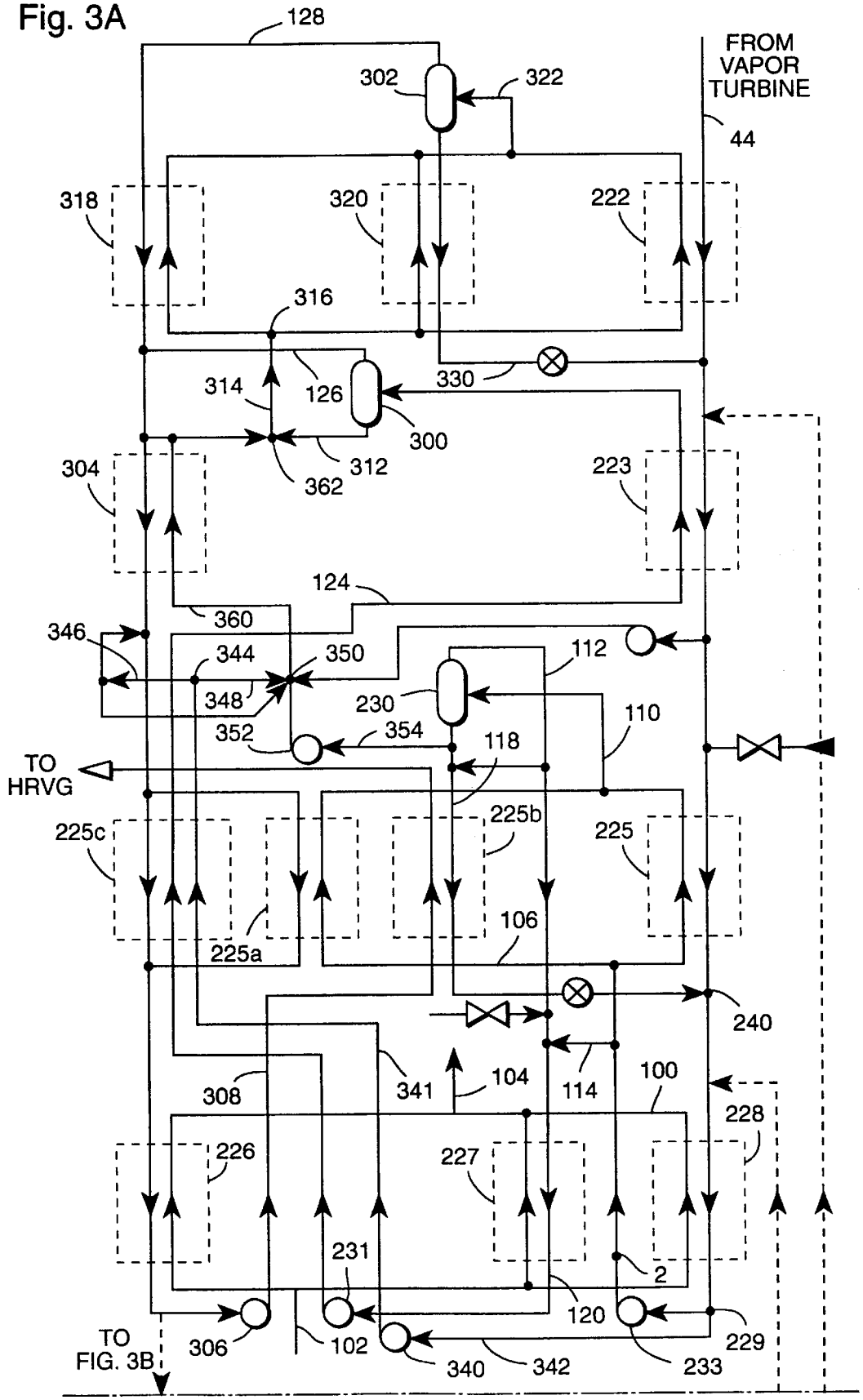
FIG. 3A is a detailed schematic illustration of the Kalina cycle DCSS.

Referring to a preferred embodiment of the distillation/condensation sub-system 16 illustrated in FIG. 3A, the low pressure spent stream 44 passes through heat exchangers 222, 223 and 225, where that stream releases heat of condensation and which stream is mixed at a stream mixer 240 with a liquid stream 118. This produces a precondensed stream which is condensed in condensor 228. Condensor 228, along with condensers 226 and 227, may be cooled by a cooling stream, e.g., of water, in line 100 having a circulating water inlet 102 and a outlet 104. The condensed stream is split at 229 and is pumped to a higher pressure by pump 233 for flow in parallel via line 106 through heat exchangers 225 and 225*a*, producing a preheated stream in line 110. This partially evaporated stream 110 is supplied to a gravity separator 230 where liquid is separated from the vapor. Thus, a vapor stream 112 exits gravity separator 230 for enrichment with a low boiling component, i.e., ammonia, in an ammonia/water mixture, via line 114 for flow through heat exchanger 227. The liquid stream from the gravity separator 230 in line 118 flows through a heat exchanger 225*b* and rejoins the spent stream 44 at mixer 240. The ammonia-enriched vapor stream 112 is joined with part of the mixing stream via line 114 and is fully condensed by condensor 227 whereby this lean stream 120 exits condensor 227 and is pumped by pump 231 at higher pressure through a further heat exchanger 225*c*. The lean stream 124 exiting condensor 225*c* passes in heat exchange relation through heat exchanger 223 for flow to a gravity separator 300. The ammonia-enriched vapor stream 126 exiting gravity separator 300 joins with a vapor stream 128, generated at a further gravity separator 302 for flow through heat exchangers 304, 225*c* and 226, where it is finally pumped via pump 306 and line 308 through heat exchanger 225*b* and ultimately to the heat recovery boiler 14. The water-enriched liquid in line 312 flowing from gravity separator 300 flows via line 314 via a separator 316 for flow through heat exchangers 318, 320 and 222 for flow via line 322 into gravity separator 302. The water-enriched liquid stream from separator 302 passes through heat exchanger 320 via line 330 where it joins the spent stream 44 cooled by heat exchanger 222.

The condensed stream split at 229 is also pumped by pump 340 in line 341 through condenser 225C to a junction 344 where it splits into two sub-streams 346 and 348, the latter terminating at a junction 350. Also flowing to junction 350 by way of pump 352 is water-enriched stream 354 separated from line 118 at the liquid outlet of gravity separator 230. A water-enriched stream flows from junction 350 via line 360, through condensor 304 to a junction 362 with the water-enriched stream from separator 300 for combined flow through condensers 318, 320 and 322 as previously described. Thus, the working fluid from the low pressure turbine LP is absorbed, condensed and regenerated by the DCSS and the boiler 14.

Figure 3B:
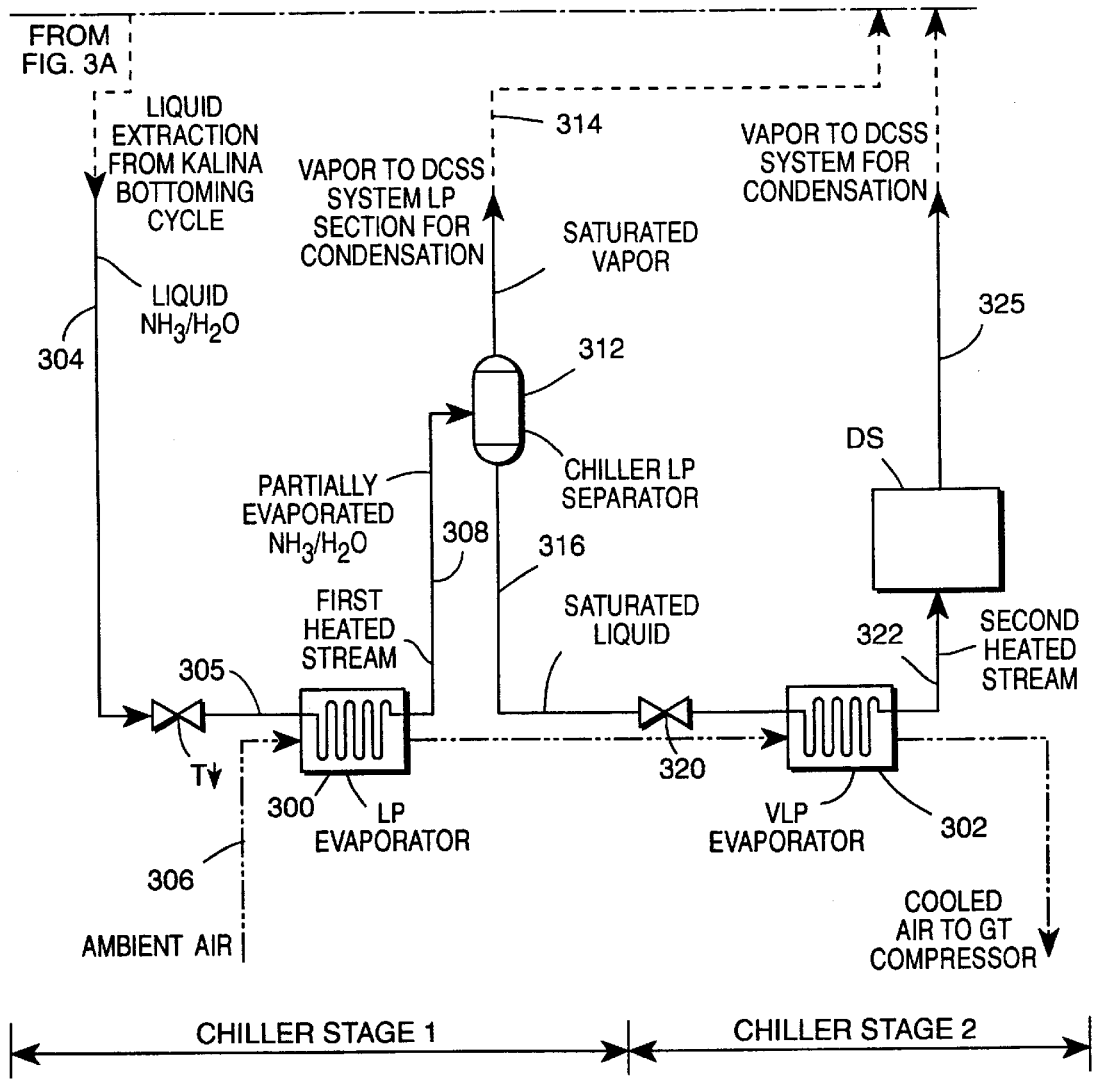
FIG. 3B is a continuation of FIG. 3A illustrating a two-stage gas turbine inlet air cooling system integrated in the Kalina cycle DCSS.

Referring now to FIG. 3B, there is illustrated a two-stage chiller system for cooling the compressor inlet air. While two stages are illustrated, it will be appreciated that multiple stages in excess of two stages may be utilized. In the two-stage chiller system, there is provided a low pressure evaporator 300 and a very low pressure evaporator 302. The multi-component working fluid is extracted from the DCSS and particularly from the high pressure condenser 226 and is used as the working fluid in the turbine inlet air cooling system. Thus, the multi-component fluid, preferably a mixture richer in the lower boiling point component than the higher boiling point component, i.e., an ammonia-rich mixture, is inlet via line 304 and throttled at T to the low pressure evaporator 300. Throttling of stream 304 results in a temperature drop to line 305. Ambient air in line 306 is passed through the low pressure evaporator 300 in heat exchange relation with the multi-component mixture of line 305. The heat from the ambient compressor inlet air is absorbed, i.e., cools the inlet air stream, and partially evaporates the multi-component mixture to form a first heated partially evaporated stream 308. This partially evaporated heated stream 308 is sent into a low pressure chiller separator 312.

Separator 312 separates the partially evaporated first heated stream in line 308 into a saturated vapor stream in line 314 and a saturated liquid stream in line 316. The saturated vapor in line 314 is returned to the low pressure section, i.e., prior to the inlet to condenser 228 of the DCSS, where it is combined with the spent stream 44 and fully condensed in the DCSS low pressure condenser 228. The saturated liquid stream 316 may be throttled at 320 to produce a further temperature drop in the liquid stream. The cooled saturated liquid in stream 316 is then passed through the very low pressure evaporator 302 in heat exchange with the cooled ambient air received from the low pressure evaporator 300 to further cool the compressor inlet air. The partially evaporated second heated stream 322 leaving the very low pressure evaporator 302 is mixed with a low boiling point component lean stream of a standard distillation system DS (FIG. 3C) which forms no part of the present invention.

Figure 3C:
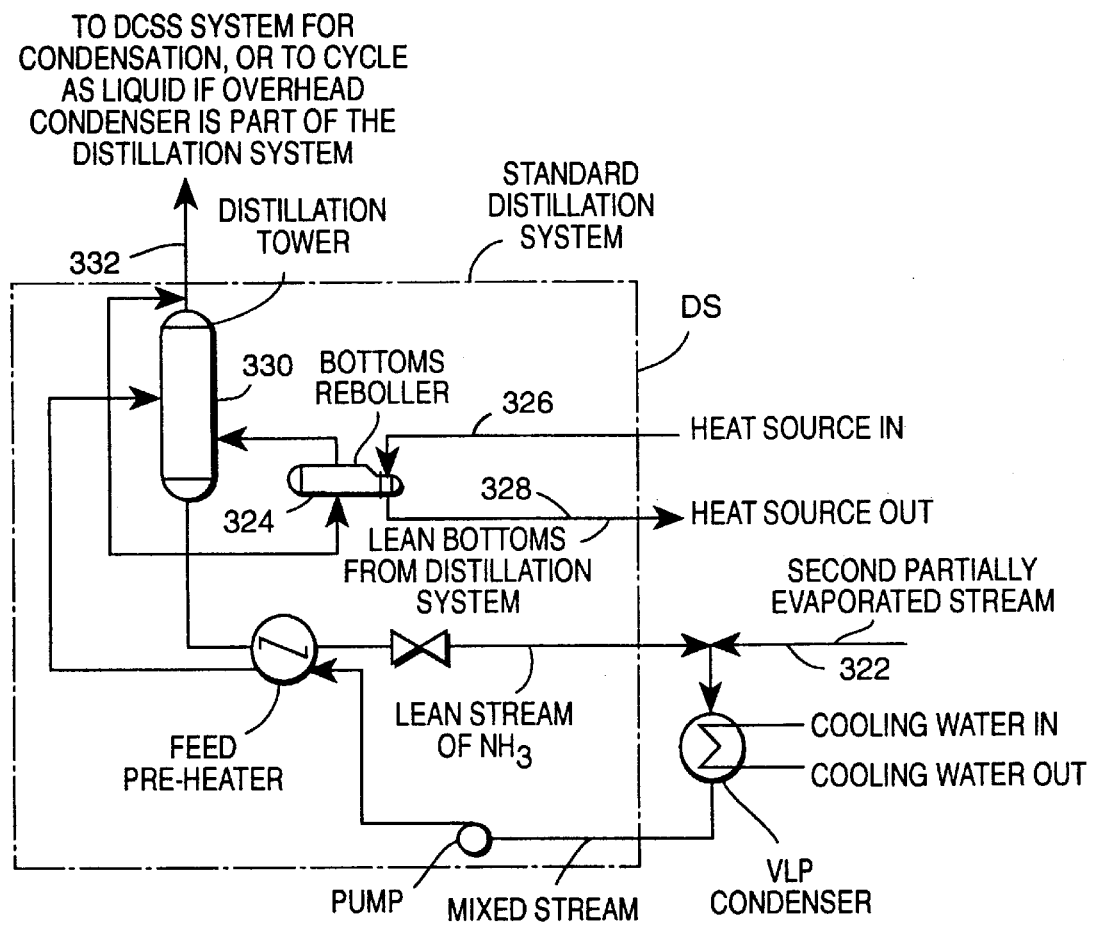
FIG. 3C is a schematic illustration of a distillation system for use with the chiller sub-system of the Kalina bottoming cycle.

The distillation system DS may comprise, for example, a bottoms reboiler 324 for receiving heat from the exhaust of the IP turbine via line 326 (FIGS. 1 and 3C). The outlet from the bottoms reboiler passes via line 328 to the inlet of the low pressure turbine. The distillation system DS employs a distillation tower 330 for returning the vapor to the DCSS system or as a liquid if an overhead condenser is part of the distillation system. The vapor is returned via line 332 for combining in line 44 with the multi-component spent vapor from the low pressure turbine.

As an alternate to sending stream 322 to the standard distillation system, this stream could be sent to the bottoming cycle vapor turbine seal leakage condensation system for condensation.

It will be appreciated that cooling applications, other than cooling the compressor inlet air, may be accomplished by the present invention. For example, condensation of other fluid streams such as vent streams, and in refrigeration processes may be accomplished.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle power generating system having a plurality of turbines, including a first turbine and a gas turbine having a compressor, said turbines being drivingly coupled to one or more generators for producing electricity, and a distillation/condensation sub-system, a method of cooling ambient air entering the gas turbine, comprising the steps of:

(a) expanding a working fluid comprised of a mixture of dissimilar components having different boiling points at the same pressure through said first turbine and generating a spent stream of said mixture of dissimilar components;

(b) condensing said spent stream in said sub-system;

(c) passing inlet air for the compressor of the gas turbine in heat exchange relation with said condensed spent stream in a first heat exchanger to cool the inlet air entering the gas turbine compressor;

(d) flowing the cooled inlet air into the compressor of the gas turbine; and passing the spent stream of step (a) through low and high-pressure condensors to provide first and second condensed spent streams, respectively, and passing the compressor inlet air in heat exchange relation in said first heat exchanger with the second condensed spent stream forming a first heated stream of dissimilar components.

2. A method according to claim 1 including, subsequent to step (c), separating the first heated stream of dissimilar components into a saturated vapor stream and a saturated liquid stream and combining the saturated vapor stream with the spent stream expanded through said first turbine.

3. A method according to claim 1 including, subsequent to step (c), separating the first heated stream of dissimilar components into a saturated vapor stream and a saturated liquid stream and passing the cooled inlet air from said first heat exchanger in heat exchange relation in a second heat exchanger with the saturated liquid stream to further cool the compressor inlet air prior to flowing the cooled air into the compressor of the gas turbine.

4. A method according to claim 3 including combining the saturated vapor stream from said first heat exchanger with the spent stream of said mixture of dissimilar components.

5. A method according to claim 2 including condensing said spent stream in said sub-system to form a stream rich in the lower boiling point component and passing the inlet air for the compressor of the gas turbine in heat exchange relation with said condensed spent stream rich in the lower boiling point component.

6. In a combined cycle power generating system having a plurality of turbines, including a first turbine and a gas turbine having a compressor, said turbines being drivingly coupled to one or more generators for producing electricity, and a distillation/condensation sub-system, a method of cooling another fluid distinct from fluids of the distillation/condensation sub-system, comprising the steps of:

(a) expanding a working fluid comprised of a mixture of dissimilar components having different boiling points at the same pressure through said first turbine and generating a spent stream of said mixture of dissimilar components;

(b) condensing said spent stream in said sub-system;

(c) passing said another fluid in heat exchange relation with said condensed spent stream in a first heat exchanger to cool said another fluid; and passing the spent stream of step (a) through low and high-pressure condensors to provide first and second condensed spent streams, respectively, and passing the another fluid in heat exchange relation in said first heat exchanger with the second condensed spent stream forming a first heated stream of dissimilar components.

7. A method according to claim 6 including, subsequent to step (c), separating the first heated stream of dissimilar components into a saturated vapor stream and a saturated liquid stream and combining the saturated vapor stream with the spent stream expanded through said first turbine.

8. A method according to claim 7 including, subsequent to step (c), separating the first heated stream of dissimilar components into a saturated vapor stream and a saturated liquid stream and passing the another fluid from said first heat exchanger in heat exchange relation in a second heat exchanger with the saturated liquid stream to further cool the another fluid.

9. A method according to claim 8 including combining the saturated vapor stream from said first heat exchanger with the working fluid expanded through said first turbine.

10. In a combined cycle power generating system having a plurality of turbines, including a vapor turbine and a gas turbine having a compressor, said turbines being drivingly coupled to one or more generators for producing electric or mechanical work and a distillation/condensation sub-system, a method of cooling ambient air entering the gas turbine, comprising the steps of:

(a) expanding a working fluid comprised of a mixture of dissimilar components having different boiling points at the same pressure through said vapor turbine and generating a spent stream of said mixture of dissimilar components;

(b) condensing said spent stream in a low pressure section of the distillation/condensation sub-system;

(c) passing inlet air for the compressor of the gas turbine in heat exchange relation with a condensed and throttled spent stream from a higher pressure section of the distillation/condensation sub-system in a first heat exchanger to cool the inlet air entering the gas turbine compressor; and (d) flowing the cooled inlet air into the compressor of the gas turbine.

11. A method according to claim 10 including passing the spent stream of step (a) through said low and higher pressure sections to provide first and second condensed spent streams, respectively, with said second condensed spent stream constituting said condensed and throttled spent stream from said high pressure section, and passing the compressor inlet air in heat exchange relation in said first heat exchanger with the second condensed and throttled spent stream forming a first heated stream of dissimilar components.

12. A method according to claim 11 including, subsequent to step (c), combining the first heat stream of dissimilar components with the spent stream expanded through said vapor turbine and condensing the combined stream in the low pressure section of the distillation/condensation sub-system.

13. A method according to claim 11 including, subsequent to step (c), separating the first heated stream of dissimilar components into a saturated vapor stream and a third condensed liquid stream and combining the saturated vapor stream with the spent stream expanded through said vapor turbine and condensing the combined stream in the low pressure section of the distillation/condensation sub-system.

14. A method according to claim 11 including, subsequent to step (c), separating the first heated stream of dissimilar components into a saturated vapor stream and a saturated liquid stream and passing the cooled inlet air from said first heat exchanger in heat exchange relation in a second heat exchanger with the third condensed liquid stream to further cool the compressor inlet air prior to flowing the cooled air into the compressor of the gas turbine.

15. A method according to claim 14 wherein the second heat exchanger generates a second partially evaporated heated stream of dissimilar components, finally condensing said second partially evaporated heated stream of dissimilar components in a distillation system with a condensor operating at a pressure lower than the distillation/condensation sub-system.

16. A method according to claim 10 including condensing said spent stream in said distillation/condensation sub-system to form said second stream rich in the lower boiling point component and passing the inlet air for the compressor of the gas turbine in heat exchange relation with said condensed and throttled spent stream rich in the lower boiling point component.

* * * * *